Sept. 30, 1969   J. S. MORENO   3,469,655
GREASE PACKER FOR AUTOMOBILE FRONT WHEEL BEARING
Filed Jan. 26, 1968
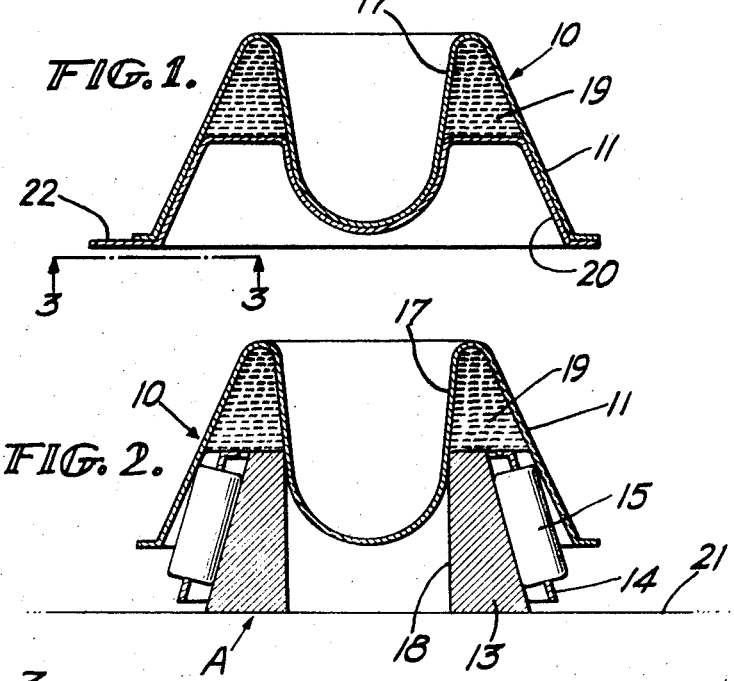
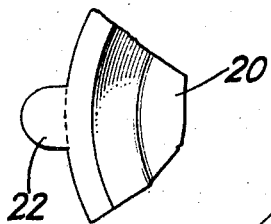
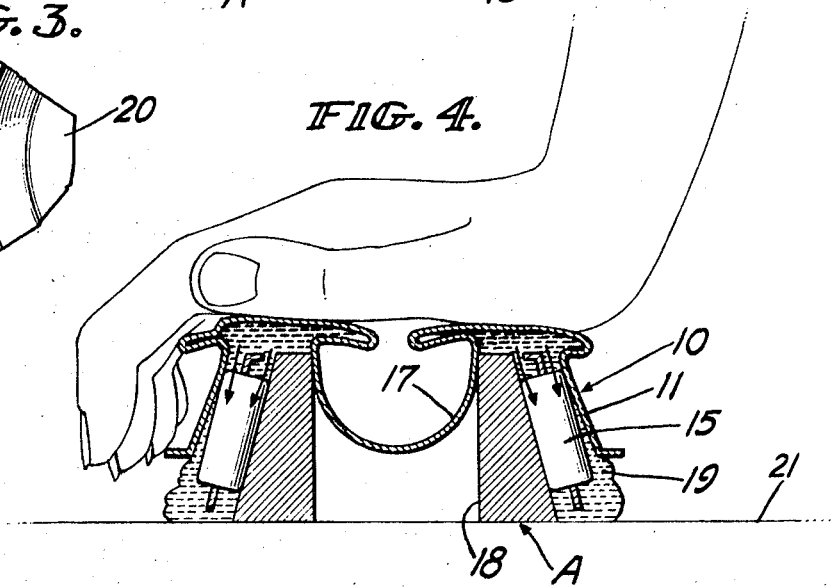
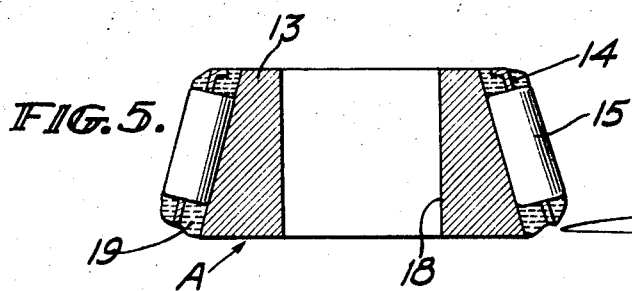
INVENTOR.
JOHN S. MORENO
BY Leonard D. Lane
ATTORNEY.

United States Patent Office 3,469,655
Patented Sept. 30, 1969

3,469,655
GREASE PACKER FOR AUTOMOBILE FRONT WHEEL BEARING
John S. Moreno, 997 Prevost St., San Jose, Calif. 95125
Filed Jan. 26, 1968, Ser. No. 700,839
Int. Cl. F16n 1/00; F01m 1/00; B65d 35/04
U.S. Cl. 184—1                          5 Claims

ABSTRACT OF THE DISCLOSURE

For packing with grease tapered roller bearings, such as those used on the front wheels of automobiles, a cup made of grease retentive material is of a size and shape to fit over a selected bearing and is provided with a central portion to fit into and substantially seal off the central opening of the inner race or cone of such bearing. A quantity of grease is contained in the cup, and a strip-off protective cover is provided over the grease. To use the invention, a bearing assembly, consisting of cone, rollers and roller cage, is removed from an automobile, cleaned, and placed on a clean surface. The protective cover is then stripped off, the cup is inverted over the bearing, and is pressed down to force the cup down onto the bearing. Thereupon the central portion of the cup seals off the axial opening in the bearing, and the grease is forced down around the rollers.

PRIOR ART

In the past machines have been developed which grip a front wheel bearing, seal off the axial opening, and force grease, from a supply thereof in the machine, between and around the rollers to pack the bearing. While a great improvement over the old hand method of smearing the grease on the bearing with a putty knife from an open can, such machines still present the problem of keeping the grease clean, in addition to requiring a substantial initial investment and occupying valuable shop space.

The structure and operation of the present invention are set forth in the following description and the accompanying drawings, wherein:

FIG. 1 is a diametrical, sectional view of an illustrative embodiment of the invention.

FIG. 2 is a similar sectional view showing the sealing cover stripped off and the cup applied to a pre-cleaned bearing.

FIG. 3 is a fragmentary view looking in the direction of the arrows 3—3 in FIG. 1.

FIG. 4 is a sectional view similar to FIGS. 1 and 2 with the cup pressed down to pack the grease between and around the rollers.

FIG. 5 is a similar sectional view of the bearing, completely packed with grease.

Referring to the drawings in detail, a cup 10 is formed of suitable, grease tight, sheet material, such as, for example, treated paper, plastic or foil, which material preferably is of a nature which can be manually crushed without fracturing. The outer wall 11 of the cup 10 is shaped to fit down around a conventional front wheel bearing assembly A, comprising the inner race or cone 13, roller cage 14, and rollers 15.

A raised or re-entrant portion 17 of the cup 10 is shaped to fit into and seal off the axial opening 18 of the bearing cone 13.

A quantity of bearing grease 19 is provided in the bottom of each cup 10, and a protective cover 20 is provided over the grease 19 to retain the latter in position and to seal out dirt and contaminants. Preferably the cover 20 is shaped to also cover the inside of the cup 10 and the central portion 17 above the grease level, so that no dirt or contaminants will be present when packing the bearing.

While the illustrative cup 10 is made from a single piece of material, it is contemplated that it may be assembled from several elements or blanks if desired in the manner of many well-known types of paper, plastic and foil cups, and that the central sealing portion 17 may, if desired, be a separate element. Such modifications will be apparent to any ordinarily skilled designer or engineer familiar with the manufacture of such cups.

In using the invention, the bearing assembly comprising the usual cone 13, roller cage 14 and rollers 15, assembled as shown, is cleaned and placed, small end up, on a clean supporting surface 21. The cup 10 is then held in one hand while the protective cover 20 is stripped off, a tab 22, which may be provided on the cover 20, serving as a convenient means for grasping the cover for removal.

The cup 10 is then inverted over the bearing assembly as shown in FIG. 2 and is pressed firmly down as shown in FIG. 4. As the cup is pressed down the central portion 17 seals off the axial opening 18 of the bearing cone 13 and the grease 19 in the cup 10 is forced down between and around the rollers, the side wall 11 of the cup preventing the grease from spreading laterally. This action completely packs the bearing with clean grease.

The cup 10 is then removed and discarded, and the bearing assembly, fully packed with grease, is ready to be replaced on the automobile from which it was removed.

The invention provides a quick, easy and inexpensive mechanism for repacking front wheel bearings, and insures brand identification for the mechanic performing the operation, and the customer if the latter is observing it. It also insures against contamination of the grease prior to removal of the protective cover, and avoids the necessity of purchasing and storing a wheel bearing packing machine.

While I have illustrated and described a preferred embodiment of the invention, it will be understood, however, that various changes and modifications may be made in the details thereof without departing from the scope of the invention.

I claim:
1. A mechanism for packing with grease an automobile front wheel bearing assembly consisting of a truncated bearing cone having an axial opening therethrough, bearing rollers surrounding the peripheral surface of said cone, and a roller cage retaining the rollers in position, said mechanism comprising,
   a cup of grease retentive material of a size and shape to fit over the smaller end of the bearing assembly,
   a quantity of bearing grease in the cup sufficient to pack the bearing,
   a central portion mounted in the cup, and of a size and shape to seal off the axial opening in the bearing cone, and
   a strip-off, easily removable, protective cover over the grease in the cup to protect the grease from contamination.

2. A mechanism for packing front wheel bearings as claimed in claim 1 wherein the cup is of a material which is capable of being crushed manually without fracturing.

3. A mechanism for packing front wheel bearings as claimed in claim 1 wherein the cover fits closely over the grease and is fitted to the interior of the cup.

4. A mechanism for packing front wheel bearings as claimed in claim 1 wherein the cover is provided with an exterior projection to facilitate removal of the cover.

5. A mechanism for packing front wheel bearings as claimed in claim 1 wherein the central portion for sealing off the axial opening of the bearing cone is a re-entrant portion of the cup bottom.

References Cited
UNITED STATES PATENTS

| | | | |
|---|---|---|---|
| 598,676 | 2/1898 | Lochmann | 222—92 |
| 1,575,567 | 3/1926 | Geake | 222—92 |
| 2,514,799 | 7/1950 | Rubertino et al. | 184—105 XR |
| 2,968,362 | 1/1961 | Elliott | 184—1 |

FOREIGN PATENTS 165,517  10/1955  Australia.

FRED C. MATTERN, Jr., Primary Examiner
M. ANTONAKAS, Assistant Examiner

U.S. Cl. X.R.

222—92; 184—105